United States Patent

Konno et al.

[15] 3,692,940

[45] Sept. 19, 1972

[54] TIMER OF AN AUTOMATIC TELEPHONE ANSWERING APPARATUS

[72] Inventors: Akira Konno, Tokyo; Tomoaki Kosaka, Yachiyo-shi, Chiba, both of Japan

[73] Assignee: Pioneer Electronic Corporation, Tokyo, Japan

[22] Filed: May 19, 1970

[21] Appl. No.: 38,855

[30] Foreign Application Priority Data

May 19, 1969 Japan ....................44/38087

[52] U.S. Cl. ....................................179/6, 179/6 E

[51] Int. Cl. ........................................H04m 11/10

[58] Field of Search ..............................179/6 E, 6 R

[56] References Cited

UNITED STATES PATENTS

| | | | |
|---|---|---|---|
| 3,127,474 | 3/1964 | Waldman | 179/6 |
| 3,310,629 | 3/1967 | Yamamoto et al. | 179/6 B |
| 2,815,401 | 12/1957 | O'Dwyer | 179/6 |
| 3,293,368 | 12/1966 | Mitsui | 179/6 |
| 3,501,592 | 3/1970 | Waldman | 179/6 B |

*Primary Examiner*—Robert L. Griffin

*Assistant Examiner*—Barry Leibowitz

*Attorney*—Sughrue, Rothwell, Mion, Zinn & Macpeak

[57] ABSTRACT

A timer for controlling the operation of an automatic telephone answering apparatus, which begins its controlling operation when a telephone is called and makes its timer period return to the starting point after the out-going message is completely read out.

2 Claims, 3 Drawing Figures

TIMER OF AN AUTOMATIC TELEPHONE ANSWERING APPARATUS

BACKGROUND OF THE INVENTION

This invention relates generally to an automatic telephone answering apparatus, and more particularly to a timer for controlling the operation of the apparatus.

A general automatic telephone answering apparatus operates as follows; when a telephone is called, a DC circuit (talking circuit) of a telephone line is closed and an outgoing message which has been recorded on a magnetic tape is reproduced and read out to a caller to inform him that the owner of the telephone is now absent and wants to record the message of the caller. At the same time, with the closing of the DC circuit, a timer, limiting the total time of the answering operation, begins its operation. After the reading of the outgoing message, a signal beep tone is sent out to inform the caller that a recorder is prepared and the caller's message can be recorded for a predetermined time period (usually about 30 seconds). In this situation, the predetermined period, for example 30 seconds, is the remaining period of the total time less the time of the outgoing message and the beep tone. Therefore, if the period for the outgoing message is too long, the period for the incoming message must be shortened, so that an assignment of the two periods is difficult. When the owner records his message, before going out, for example, "... After a beep tone, please leave your message. This apparatus will record the message within 30 seconds." He must know how long the outgoing message takes, otherwise he can not determine how many seconds can be used for the recording of the incoming message.

One method to resolve this problem is the use of an endless tape for the outgoing message. Thus, the period that the tape runs one round is constant, since it is endless, and the period for the recording of the incoming message is constant also.

Other methods proposed to resolve these problems are the use of two mechanical or electrical timers, one for the outgoing message and the other for the incoming message. The mechanical timer gives an accurate time but it is expensive to manufacture and large in construction, and the electrical timer is complex in construction because of its circuitry.

SUMMARY OF THE INVENTION

It is therefore the main object of this invention to provide a novel and improved timer of an automatic telephone answering apparatus in which one electrical timer circuit is used and an accurate time is easily obtained.

Another object of the present invention is to provide an improved timer of an automatic telephone answering apparatus which uses any of several endless tape cartridges wherein the length of the magnetic tape is different for each cartridge and the cartridges can be selectively used without adjustment of recording time for an incoming message. A further object of the present invention is to provide an improved timer of an automatic telephone answering apparatus in which a time constant of an electrical timer circuit may be comparatively small.

A still further object of the present invention is to provide an improved timer of an automatic telephone answering apparatus which acts as a safety means for the misoperation of the apparatus and which is reliable in operation.

DESCRIPTION OF THE PREFERRED EMBODIMENT

Figure 1:
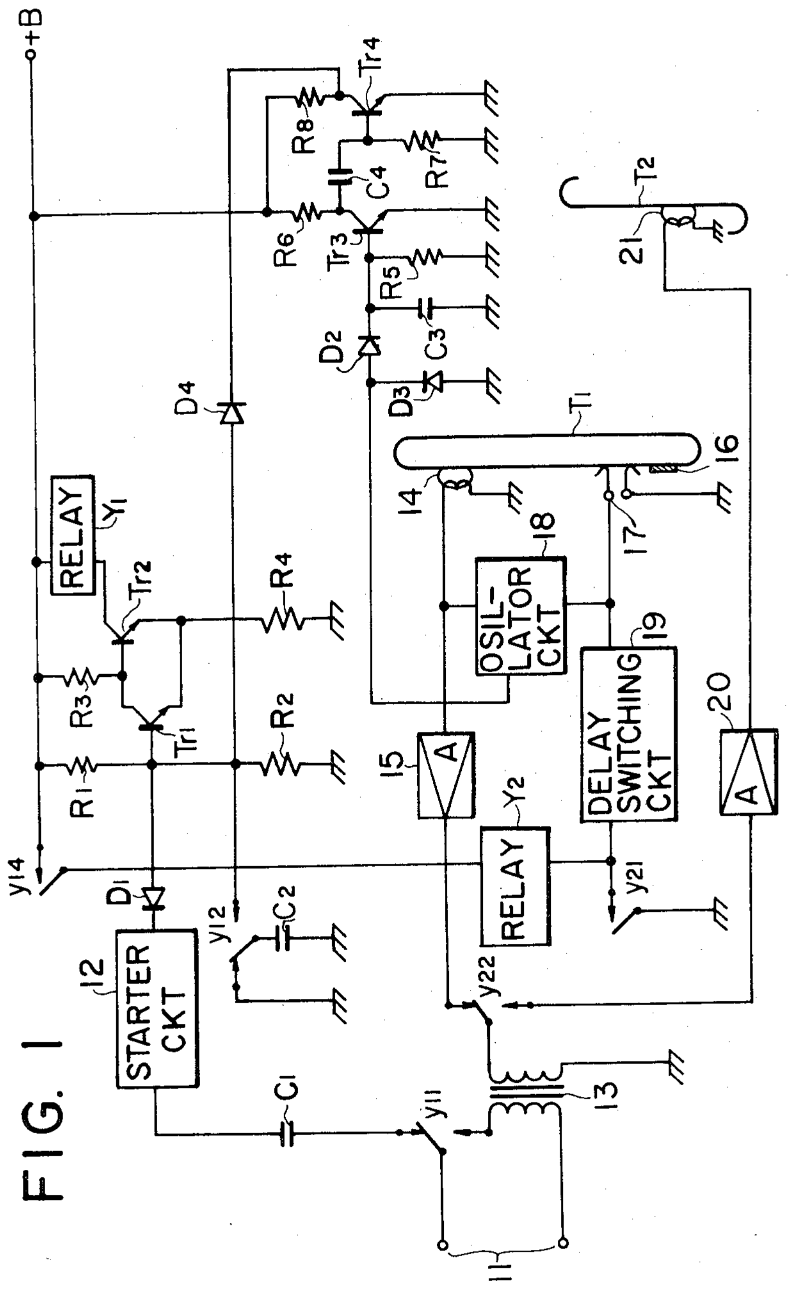
FIG. 1 is a circuit of one embodiment of the present invention.
Figure 2:
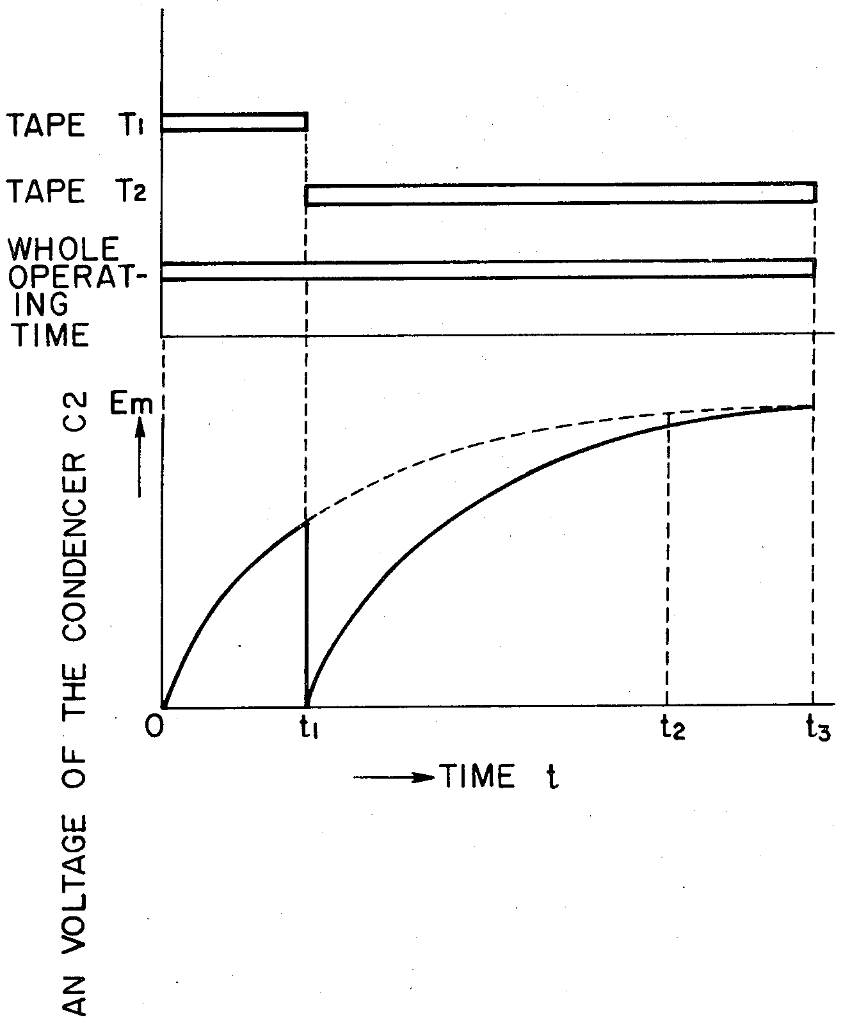
FIG. 2 is a timing chart to use for the explanation of the operation of the circuit shown in FIG. 1.

Referring to the FIG. 1, a ringing current sent from a telephone line to a terminal 11 is connected to a starter circuit 12 through contact *y*11 of a relay Y1 and a coupling condenser C1. Between 3 to 10 seconds after receiving the first ringing current, the starter circuit 12 changes the base potential of a transistor Tr1 to substantially earth potential through a diode D1 to place the device in its answering state. Transistors Tr1 and Tr2 form a Schmitt trigger circuit with resistors R1 through R4. In the stand-by state awaiting the ringing current, the transistor Tr1 is in a conductive state, hereinafter called "ON," and the transistor Tr2 is in a non-conductive state, hereinafter called "OFF." When the base potential of the transistor Tr1 becomes substantially at earth potential, the Schmitt trigger circuit is switched resulting in the transistor Tr1 turning OFF and the transistor Tr2 turning ON. Consequently, the relay Y1 is energized and its contacts are switched. By the contact *y*11, the telephone line is connected to a transformer 13. A condenser C2 which was held in an uncharged state by means of a contact *y*12 is connected to the base of the transistor Tr1 by the contact *y12* and is charged gradually through the resistor R1. The point in time when the charging to the condenser C2 through the contact *y*12 is started, is shown in FIG. 2 as time $t=0$. In consequence of switching of the contact *y*11 the operation of the starter circuit 12 stops; but until the condenser C2 is charged to predetermined voltage Em, the transistor Tr1 is held OFF, and the relay Y1 is energized. Simultaneous with the above, a motor begins to rotate and a tape drive mechanism starts its operation by means of a contact of the relay Y1 causing a tape for outgoing messages T1 to run.

The outgoing message previously recorded on the tape T1 is reproduced by a magnetic head 14, amplified by an amplifier 15, and read out to the caller through contact *y*22 of relay Y2, the transformer 13 and terminals 11. The tape T1 is of the endless type and, when it runs approximately one revolution, a conductive foil 16 afixed to the tape T1 short-circuits a pair of electrodes 17 and causes an oscillator circuit 18 to operate to send a signal tone called a "beep tone." The beep tone informs the caller that the outgoing message is completed, and that the apparatus is going to switch to a recording state to record the incoming message of the caller. When the electrodes 17 are short-circuited by the conductive foil 16, a delay switching circuit 19 operates concurrently with the oscillator circuit 18, and energizes a relay Y2 after its delay time of approximately one to two seconds. The relay Y2 is continuously held on by contact y14 and its contact y21, even if the conductive foil 16 has passed electrodes 17. The tape T1 stops running and then a tape for incoming messages T2 is driven by a tape drive mechanism (not shown) which cooperates with the relay Y2. By the switching of the contact y22, the incoming message from the caller passes through the terminal 11, the contact y11, transformer 13 and the contact y22, and is amplified by an amplifier 20, and is then recorded in the tape T2 by a magnetic head 21. This recording state is held till the relay Y1 is released.

A portion of the output signal of the oscillator circuit 18 is, simultaneously with being sent to the caller, rectified by diodes D2 and D3, smoothed by a condenser C3, then fed to a base of a transistor Tr3 thereby causing transistor Tr3 to turn ON. A condenser C4 which was held in a charged state through resistors R6 and R7 is discharged through the transistor Tr3. Then, as the oscillator circuit stops oscillating, the transistor Tr3 turns OFF and the condenser C4 is charged again through resistors R6 and R7. the charging current of C4 raises the base potential of the transistor Tr4, so the transistor Tr4 turns ON. The condenser C2, which has been gradually charged from the beginning of the operation of the relay Y1, is discharged through the contact y12, a diode D4 and the transistor Tr4, and causes the timer to start again from the zero point (see the time *t*1 of FIG. 2). If the discharging operation is not performed, the condenser C2 will be charged up to approximately the predetermined voltage Em at the time *t*2 and the relay Y1 would be released, but the time at when the condenser C2 is charged up to the voltage Em is prolonged to the time *t*3. When the condenser C2 is charged up to the voltage Em, the transistor Tr1 turns to ON, the transistor Tr2 turns to OFF and the relay Y1 is released, and the apparatus completes its receiving operation, that is, it returns in the standby state to wait the next calling.

The circuit can be arranged such that condenser C2 is discharged by electrodes 17 or other electrodes which are short-circuited by the conductive foil 16, rather than discharging through the transistor Tr4 which is turned ON by the smoothed current of the oscillator circuit 18. But, there is a possibility that the conductive foil 16 may be damaged or miss its short-circuiting operation, and therefore the discharging circuit, as described above, wherein any mechanical contacts are not adopted is more reliable.

Figure 3:
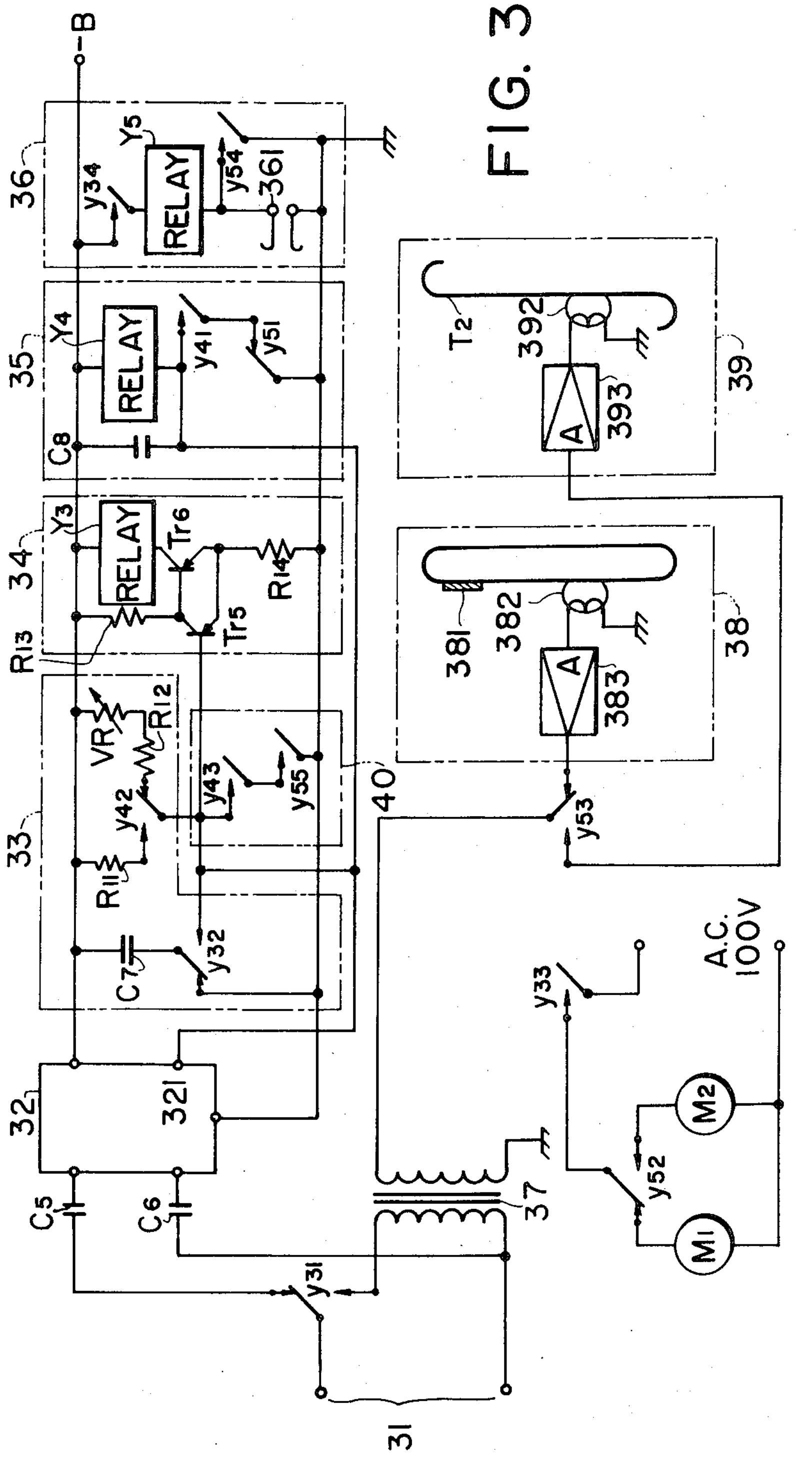
FIG. 3 is a circuit of another embodiment of the present invention.

Referring now to FIG. 3, the operation of the other embodiment of the present invention will be explained in detail. Numeral 31 is a terminal to which a telephone line is connected, and a ringing current from any subscriber of the telephone wire system is fed to a starter circuit 32 through a contact y31 and coupling condensers C5 and C6. Between 3 to 10 seconds after receiving of the first ringing current, the starter circuit 32 switches its terminal 321 to earth potential for a moment to place the device in its answering state. Block 33 is a timer circuit being composed of a condenser C7, resistors R11 and R12, and a variable resistor VR. By switching a contact y42, the condenser C7 and the resistor R11 compose the first timer circuit, and the condenser C7 and the resistor R12 compose the second timer circuit. Block 34 is a switching circuit comprising transistors Tr5 and Tr6, resistors R13 and R14, and a relay Y3. The switching circuit 34 is set in its operating period by the timer circuit 33, and holds the apparatus in the operating state during this period. Block 35 is a switching circuit being composed of a relay Y4 and a condenser C8. When an outgoing message is read to a caller, the switching circuit is connected with the first timer circuit by a contact y42 of the relay Y4, and after the outgoing message is completely read out, the switching circuit is connected with the second timer circuit by the contact y42. Block 36 is a detecting circuit to detect the end of the outgoing message, which is composed of a relay Y5 and electrodes 361. The electrodes 361 are short-circuited by a conductive foil 381 fixed to a tape T1 of the outgoing message. 37 is a transformer. Block 38 is an outgoing means comprising the tape T1 in which the outgoing message is recorded, a magnetic head 382 and an amplifier 383. If the several cartridges which contain an endless tape are prepared, and if outgoing messages recorded thereon are different from each other, the outgoing message can be changed as occasion demands without time and trouble. Block 39 is an incoming means which comprises a tape T2 for recording the incoming message, a magnetic head 392 and an amplifier 393, and which records the incoming message from a caller. Block 40 is a charging circuit which comprises contacts y43 and y55, and which charges the condenser C7. M1 is a motor to transport the tape T1, and M2 is a motor to transport the tape T2.

When the ringing current comes to the terminal 31, the current is led into a starter circuit 32, and after three to ten seconds after receiving the first ringing current, the starter circuit 32 switches terminal 321 to earth potential for a moment. Operation of starter circuit 32 is easily obtained by well-known circuitry. For example, a circuit may be used in which the ringing current is rectified and used to charge a condenser, 3 to 10 seconds after the condenser is charged to a predetermined voltage, a Schmitt trigger circuit is fired causing a relay to operate, thereby grounding a contact of the relay. When the relay Y3 is energized by the grounding operation of the starter circuit 32, the contact y31 is switched and the ringing current which is fed into the starter circuit 32 is cut off, and said circuit 32 ceases operation. Therefore the terminal 321 is grounded only for a moment.

At this time, the transistor Tr5 switches into a nonconductive state (hereinafter called "OFF"), from the conductive state (hereinafter called "ON") in which the base bias voltage was derived through the variable resistor VR of the timer circuit 33 and through the resistor R12. By the switching of transistor Tr5, the transistor Tr6 turns ON and causes the relay Y3 to operate. The condenser C7 which has been charged to the source voltage is connected with the base of the transistor Tr5 by the switched contact y32. Simultaneously, when the terminal 321 of the starter circuit 32 is grounded, the relay Y4 is energized and is held through its contact y41 and contact y51. The condenser C7 and the resistor R11 comprise a first timer circuit with the contact y42. The transistor Tr5 stays OFF, so the relay Y3 is held, till the condenser C7 is discharged to the predetermined voltage. The motor M1 is energized through the contact y33 and y52 and causes the tape T1 to run. The outgoing message previously recorded in the tape T1 is reproduced by the magnetic head 382, amplified by the amplifier 383 and read out to the caller through the contact *y*53, the transformer 37 and the contact *y*31. The tape T1 is of the endless type and, when it makes one revolution, a conductive foil 381 fixed to the tape T1 short-circuits a pair of electrodes 361 and causes the relay Y5 to operate. The relay Y5 is held energized through its contact *y*54. The relay Y4 which was self-held is released by the contact *y*51, but maintains energization for a moment with the discharging current of the condenser C8. During the delay time, the condenser C7 is charged up again to the source voltage through the charging circuit 40 which comprises the contact *y*43 and *y*55. At the same time that the relay Y4 is released, the second timer circuit which comprises the variable resistor VR, the resistor R12 and the condenser C7 is connected with the switching circuit, and the relay Y3 is continuously held. The period in which the relay is operating, that is, the period for the recording of the incoming message can be selected at will by varying the variable resistor VR. The motor M2 is energized through the switched contact *y*52 and causes tape T2 to run. The incoming message from the caller is fed into the incoming means 39 through the terminal 31, the contact *y*31, the transformer 37 and the contact *y* 53, and then recorded in the tape T2. After the time period which is set by timer circuit 33, the switching circuit 34 reverses and causes the relay Y3 to release. The telephone line is opened by the contact *y*31, the source circuit for the motor M2 is opened by the contact *y*33, and the apparatus returns to the standby state to await the next call.

According to the present invention, as described hereinabove, the time for the recording of the incoming message is accurately set, because the timer is returned to the starting point after reading out the outgoing message. Therefore, it is unnecessary to be concerned about the recording time for the incoming message, even if the outgoing message which is recorded on an endless tape of a tape cartridge is set in the apparatus.

Further, if the tape for the incoming message is not formed on an endless tape, but is wound on two reels, the so called reel-to-reel type, the recording time of the outgoing message can be set by the owner as long as it is shorter than the operating period of the relay Y1 (or Y3), therefore if the owner is unaccustomed to the use of the apparatus, he can easily record his outgoing message.

Still further, according to the present invention, the first timer circuit for the outgoing message and the second timer circuit for the incoming message use a common condenser; therefore, the capacity and the form of the condenser may be small, and any error in the time constants of these timers will be small. For example, misoperation can be prevented if the recording operation is stopped in 25 seconds, notwithstanding that the outgoing message informed a caller to record his message for 30 seconds.

Furthermore, according to the present invention, since the time of the first timer circuit is shorter than the whole operation time of the apparatus, even if the conductive foil of the tape T1 fails to make contact and the tape T1 cannot be stopped, the apparatus can be returned to the standby state to await the next calling after the time period of the first timer circuit and the telephone line is not occupied needlessly.

What is claimed is:

1. An automatic telephone answering apparatus which connects to a telephone line, said apparatus having a standby state and an answering state wherein said apparatus is in its answering state for a first time period and, during said answering state, said apparatus reads an outgoing message over said telephone line and then receives and records an incoming message over said telephone line wherein said apparatus comprises:

a. starter circuit means, responsive to a ringing signal on said telephone line;

b. timer means capable of timing for a predetermined time period no longer than said first time period, coupled to said starter circuit means for keeping said apparatus in its answering state during said first time period, said timer means being switched to its initial state in response to the output of said starter circuit, wherein said timer circuit means comprises a resistor and a condenser in an RC circuit;

c. outgoing message means for reading out a message over said telephone line, said outgoing message means being coupled to said timer means such that the maximum time period which said outgoing message means can operate is the predetermined time period of said timer means;

d. reset means, responsive to the end of the operation of said outgoing message means, for resetting said timer means to its initial state, wherein said reset means includes a discharge means for providing a discharge path for said condenser; and e. recorder means, responsive to the end of the operation of said outgoing message means, for recording an incoming message over said telephone line, wherein the operation of said recorder means is timed by said timer means and said recorder means operates for a period of time equal to said predetermined time period of said timer means and wherein said first time period is equal to the operating time of said outgoing message means and said recorder means.

2. An automatic telephone answering apparatus which connects to a telephone line, said apparatus having a standby state and an answering state wherein said apparatus is in its answering state for a first time period and, during said answering state, said apparatus reads an outgoing message over said telephone line and then receives and records an incoming message over said telephone line, wherein said apparatus comprises:

a. starter circuit means, responsive to a ringing signal on said telephone line;

b. outgoing message means for reading a message over said telephone line;

c. recording means for recording an incoming message sent over said telephone line;

d. first timer means, capable of timing for a predetermined time period, coupled to said starter circuit means and responsive thereto, for keeping said apparatus in its answering state during the operation of said outgoing message means, wherein the maximum time period which said outgoing message means can operate is the predetermined time period of said timer means, said first timer means comprising a first resistor and a condenser, said condenser being previously charged;

e. second timer means capable of timing for a predetermined time period, for keeping said apparatus in its answering state during the operation of said recording means, wherein the operation of said recording means is timed by said second timer means and said recorder means operates for a period of time equal to said predetermined time period of said second timer means;

f. first switching means operated by said first and second timer means, said first switching means keeping said apparatus in said answering state during said first time period;

g. second switching means for connecting said first switching means to said first timer means during the period of operation of said outgoing message means and for connecting said second timer means to said first switching means during the period of operation of said recording means; and h. charging means for charging said condenser after the operation of said outgoing message means.

* * * * *